July 7, 1936.  L. PREISMAN  2,046,841
MANUFACTURE OF PHOSPHATES
Filed July 29, 1933  2 Sheets-Sheet 1
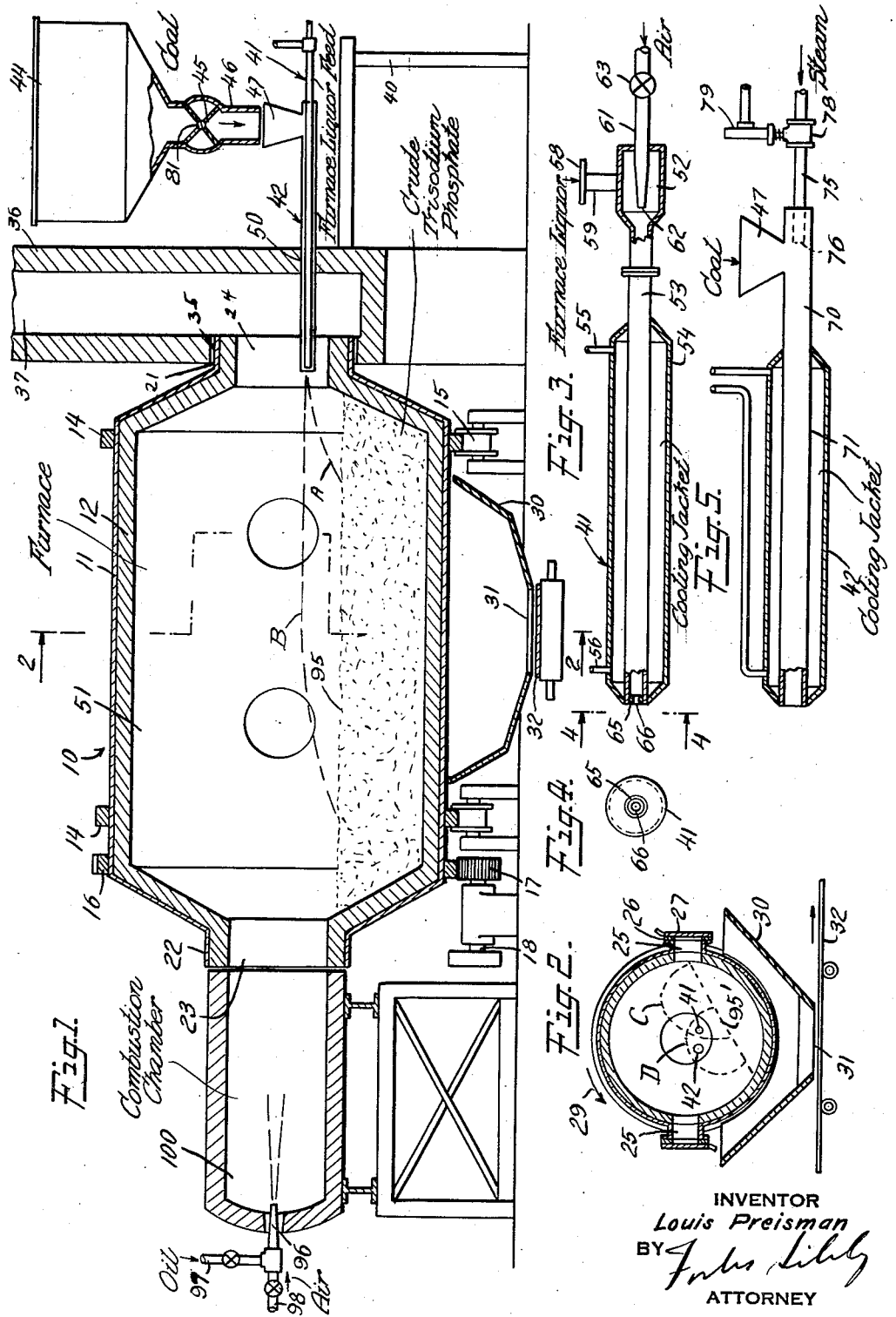
INVENTOR
Louis Preisman
BY
ATTORNEY July 7, 1936.  L. PREISMAN  2,046,841
MANUFACTURE OF PHOSPHATES
Filed July 29, 1933  2 Sheets-Sheet 2

INVENTOR
Louis Preisman
BY
ATTORNEY

Patented July 7, 1936

2,046,841

UNITED STATES PATENT OFFICE 2,046,841

MANUFACTURE OF PHOSPHATES

Louis Preisman, Wilmington, Del., assignor to General Chemical Company, New York, N. Y., a corporation of New York Application July 29, 1933, Serial No. 682,801

13 Claims. (Cl. 23—106)

This invention relates to the manufacture of alkali metal phosphates, and more particularly to processes for producing di- and/or trialkali metal phosphates. Although directed to the production of alkali metal phosphates generally, for convenience, the process constituting the invention will be described in connection with the making of sodium phosphates.

Alkali phosphates have heretofore been produced by methods such as those described in U. S. Patents Nos. 744,128, November 17, 1903, and 1,037,837, September 3, 1912, to Strickler. In the process of the former patent, phosphate containing material, such as ordinary phosphate rock (calcium phosphate), is digested in a water solution of nitre cake ($NaHSO_4$). According to Patent 1,037,837, phosphate rock may be digested with sulfuric acid, and, after the removal of the precipitated calcium sulfate, salt cake ($Na_2SO_4$) is added to the phosphoric acid solution. In the processes of both patents, the solutions of crude phosphoric acid and sodium salts of sulfuric acid thus obtained are furnaced with carbonaceous material to produce trisodium phosphate.

The Lohmann U. S. Patent No. 1,727,551, September 10, 1929, describes a modified procedure, relating to the Strickler processes, according to which procedure by utilization of a preferred ratio of sodium sulfate to phosphoric acid in the furnace mix, a furnaced material having desirable physical properties, and a higher yield and degree of purity of phosphate products are obtained. Further improvements involving principles of the Strickler patents are disclosed in Levermore U. S. Patent No. 1,866,657, July 12, 1932. The Levermore patent describes the digestion of phosphate rock in sulfuric acid, and separation of precipitated calcium sulfate. The crude phosphoric acid solution is then neutralized to produce sodium phosphate liquor and a precipitate known in the art and referred to herein as "white mud". On separation of liquor and white mud, the latter may be incorporated as a principal constituent of a mix furnaced with carbonaceous material by the process of the Strickler patents. The white mud produced in the neutralization stage of the process of the Levermore patent contains principally phosphates of sodium, calcium, iron and aluminum, and sodium fluosilicate ($Na_2SiF_6$).

In the operation of the Strickler and Lohmann processes, whether in accordance with these patents alone or when performed in conjunction with the process of the Levermore patent, i. e. utilizing white mud produced by the Levermore process as part of the furnace mix, the ultimate product obtained, after dissolving furnace material in water and subsequent concentration and crystallization, is trisodium phosphate. Mother liquor resulting from crystallization contains quantities of trisodium phosphate ($Na_3PO_4$), sodium hydroxide (NaOH), sodium sulfate ($Na_2SO_4$), and sodium carbonate ($Na_2CO_3$).

The furnacing operation of the prior art is described in detail in the Strickler and Lohmann patents. Reactions involved are complicated, and are set forth as understood in Strickler Patent 744,128 and in the Lohmann patent. In the prior practice, after charging the sodium sulfate-phosphoric acid liquor into the furnace, the subsequent reaction involves five phases: (1) the charge is heated by direct reducing flame until the liquor dries; (2) heating is continued until the solid mix fuses; (3) heating is continued with the reducing flame until the charge commences to foam, this indicating the beginning of the reduction of sodium sulfate to sulfide; (4) carbonaceous fuel is then added in small charges until the furnace mix becomes granular and shows only a few percent of sodium sulfate; (5) when the latter stage is reached, the heating flame may be made oxidizing by an increased supply of air, to aid in whitening the charge. Because of the evident complicated nature of the reactions and the various physical changes through which the materials involved pass, the process has always been operated on a batch basis, and previous attempts to increase production of a given unit of apparatus have been unsuccessful.

One of the principal objects of the present invention is to provide a method by which a mixture comprising preferably sodium salts of sulfuric acid and crude phosphoric acid may be furnaced with carbonaceous material in a continuous manner to produce trisodium phosphate. The invention also aims to provide a method by means of which a process, heretofore because of the complicated nature of the reaction involved has been considered only as a batch proposition, may be carried out on a continuous basis, thus making available in the manufacture of alkali metal phosphate by the furnacing method the advantages of continuous operation.

As noted, the furnace mix comprises principally sodium sulfate and crude phosphoric acid. This mixture may be made up from raw materials such as salt cake ($Na_2SO_4$), nitre cake ($NaHSO_4$), rock salt (NaCl), crude phosphoric acid ($H_3PO_4$), and pure or impure sulfuric acid. The furnace product is crude trisodium phosphate, which may be dissolved in water or mother liquor and subsequently treated to produce trisodium phosphate or disodium phosphate.

In the manufacture of di- and/or trisodium phosphate, there are produced substantial quantities of di- and trisodium phosphate mother liquors, and also the so-called white mud from a disodium phosphate process such as shown in the Levermore patent. These by-product substances contain sodium and $P_2O_5$ values which, when operating on a commercial scale, must be saved. To recover these values, a furnace mix may be made up containing for example disodium phosphate mother liquor and salt cake, or a mix may be made up of trisodium phosphate mother liquor, white mud, sulfuric acid, crude phosphoric acid, salt cake, nitre cake and rock salt. These furnace mixes utilizing such by-product substances as a major portion of the mix constituents, may then be furnaced in accordance with the improvements of the invention.

Another object of the invention comprises the provision of apparatus for carrying out the improved process.

The invention is such that the nature of the invention, and additional objects and advantages thereof may be more readily understood from a consideration of the following description taken in connection with the accompanying drawings, in which Fig. 1 is a vertical longitudinal section of the furnace;

Fig. 2 is a transverse vertical section, on reduced scale, on line 2—2 of Fig. 1;

Fig. 3 is an enlarged, longitudinal vertical section of a device for feeding liquor to the furnace;

Fig. 4 is an elevation taken approximately on the line 4—4 of Fig. 3;

Fig. 5 is a vertical longitudinal section of a device for feeding carbonaceous material such as coal into the furnace;

Figure 6:
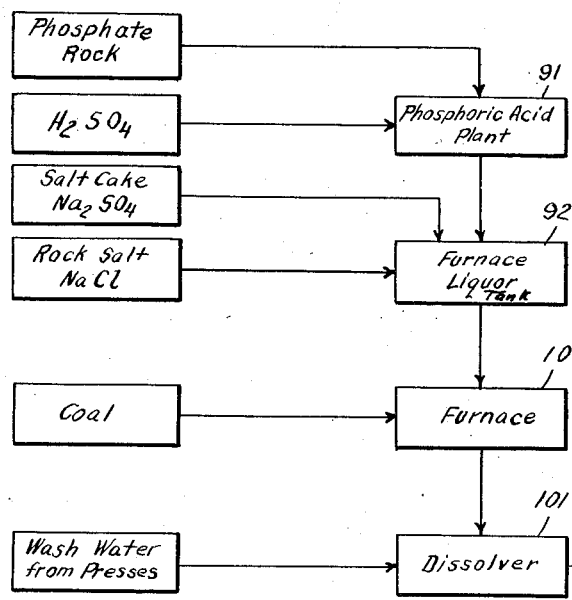
Fig. 6 is a flow sheet illustrating the operation of the process when utilizing raw materials as sources of phosphate and sodium.

Referring to Fig. 1 of the drawings, 10 indicates a rotary furnace comprising a steel shell 11 having a lining of suitable refractory material 12. Fixed to shell 11 are tires 14 resting in supporting rollers 15. On one end of the shell is a gear 16, meshing with pinion 17, connected through a shaft 18 to a source of power for revolving the furnace.

The ends of the furnace shell are provided with short sections 21 and 22 forming gas inlet and outlet eyes 23 and 24. As shown in Figs. 1 and 2, the cylindrical section of the furnace has four furnace product discharge sleeves 25, the outer ends carrying fixed plates 26 each equipped with a gate 27 which covers an opening in plates 26. Gates 27 are slidably attached to plates 26 so as to permit adjustment of the size of the openings in plates 26, in this manner making provision for regulation of the amount of material discharged through sleeves 25 on rotation of the furnace in the direction of the arrow 29 (Fig. 2).

Positioned beneath the shell so as to catch material discharged through sleeves 25 is a hopper 30 having an outlet 31 at the bottom through which material passes to a conveyor 32 (Fig. 2).

Cylindrical section 21 of the furnace projects into an opening 35 in the base of stack 36 forming a flue 37 through which gases and vapors from the furnace may be discharged from the apparatus.

Suitably mounted on framework 40 are a liquor feed device 41, a coal feeder 42, both shown diagrammatically in Fig. 1, and a supply bin 44 having in the bottom a star feeder 45 which charges material through conduit 46 into a hopper 47 at one end of feeder 42. As will be seen in Fig. 1, the liquor feed 41 and the coal feeder 42 are positioned approximately in the same horizontal plane and pass through an opening 50 in the exit flue wall, extend through the flue and into gas outlet eye 24, the ends of the feeders terminating just short of the reaction chamber 51 in the furnace 10.

Fig. 3 is an enlarged vertical section of the liquor feeder 41. The latter comprises principally a mixing chamber 52 and a cylindrical inlet conduit 53. That section of conduit 53 lying within the flue 37 and projecting into the furnace eye 24 is enclosed in a jacket 54 through which cooling liquid may be circulated by pipes 55 and 56. A liquor conduit from the furnace mix make-up tanks is connected by a coupling 58 with a short pipe section 59 through which liquor is introduced into the mixing chamber 52. An air pipe 61, having on the inner end a restricted nozzle 62, extends into the mixing chamber, the amount of air passing through pipe 61 being controlled by a valve 63. Set in the end of conduit 53 within the furnace is a disc 65 having a circular opening 66.

Fig. 5 is an enlarged vertical section of a feeder 42 for charging carbonaceous material such as coal into the furnace. The feeder comprises principally a cylindrical conduit 70, the end extending through stack 37 and into eye 24 being provided with a jacket 71 for cooling liquid. Hopper 47, positioned beneath the outlet pipe 46 of bin 44, feeds coal into the conduit 70. Steam pipe 75, extending into conduit 70 and terminating at 76 beneath the hopper 47, is connected to a source of steam not shown. The pipe also includes a control valve 78 connected through a suitable cam, shown diagrammatically at 79, with shaft 81 of the star feeder 45 of Fig. 1. The mechanism between shaft 81 and valve 78 is preferably such that when star feeder 45 is operated to feed material from bin 44 into hopper 47, valve 78 is synchronously opened to permit injection of such quantity of steam into conduit 70 as will carry the coal fed into conduit 70 from bin 44, through pipe 70 and into the furnace.

The process will be first described when making up the furnace mix from raw materials, and may be understood from a consideration of the following description taken in connection with the flow sheet of Fig. 6.

Crude phosphoric acid of acid plant 91 is employed in making up the furnace mix, and consequently may be a crude phosphoric acid containing appreciable quantities of impurities. As organic material and arsenic are eliminated from the process during furnacing, the phosphate rock employed in making up the acid in plant 91 need not be previously calcined, and the sulfuric acid used for digesting the phosphate rock may be a relatively low-grade acid containing arsenic and other impurities, such as the acid recovered from the wet purification of sulfur dioxide gases in the manufacture of sulfuric acid by the contact process, such acid being commonly known in the art as dust chamber acid.

The furnace liquor mix formed in tank 92 may be made up of materials such as salt cake, nitre cake, or rock salt (NaCl) used separately or in any combination, together with crude phosphoric acid and sulfuric acid. The furnace liquor may be made up of various constituents, the following being illustrative examples of the nature and quantity of materials going into a furnace mix:

*Example 1*

|  | Pounds |
|---|---|
| Salt cake (96% $Na_2SO_4$–42% $Na_2O$) | 42000 |
| Dust chamber acid (62% $H_2SO_4$) | 6400 |
| Phosphoric acid (18% $P_2O_5$) | 80000 |

*Example 2*

|  | Pounds |
|---|---|
| Salt cake (96% $Na_2SO_4$–42% $Na_2O$) | 28100 |
| Rock salt (52% $Na_2O$) | 11300 |
| Dust chamber acid (62% $H_2SO_4$) | 6400 |
| Phosphoric acid (18% $P_2O_5$) | 80000 |

Whatever is employed using salt cake, nitre cake, or rock salt alone or any combination, the crude phosphoric acid and the sulfuric acid are preferably first fed into the mix tank 92. Solid materials are then added until the saturation point of the resulting solution is approximately reached. The remaining quantities of solid materials needed to make up the batch are preferably ground to pass 20–40 mesh for example and added to the mix. If more than one sodium salt is used in forming the batch, it is preferred to add all of the more soluble salt and also some of the less soluble salt, if needed, to bring the solution to the saturation point, and then grind only the balance of the more insoluble salt. The resulting mass is a liquor containing solid material in suspension, and hence is preferably kept in a state of agitation to prevent settling.

The mix, comprising a thin slurry, formed in tank 92 in accordance with any of the above examples has a $Na_2SO_4$–$P_2O_5$ ratio of about 2.8:1. The liquor also contains an acidity equivalent to about 2–4% free sulfuric acid. In making up the batch, the quantity of sulfuric acid employed is preferably such as to provide in the resulting mix an acidity equivalent to about 2–4% free sulfuric acid to insure volatilization of HF and $SiF_4$ and consequent removal of these compounds from the mix in the subsequent furnacing operation. By using phosphoric acid in forming the batch, a liquor of high strength may be made since the gypsum-mud has been settled out of the acid solution previous to the addition of soda salts.

In making up the mix in tank 92, the preferred ratio of $Na_2SO_4$ to $P_2O_5$, substantially within the limits of 2.75 to 2.85 of $Na_2SO_4$ to 1 of $P_2O_5$ is maintained as in the Lohmann patent. As described therein, the ratio is preferably within the above limits, or in other terms, the proportion of $Na_2SO_4$ should preferably be approximately 92 to 95% of that theoretically required to produce trisodium phosphate. If the $Na_2SO_4$–$P_2O_5$ ratio of the liquor in tank 92 is outside the limits noted, the ratio may be adjusted as needed by adding proper quantities of phosphoric acid or sodium salts. If sodium bisulfate is used, in forming the mix, the acid of the bisulfate is taken into account when providing for the above noted excess of sulfuric acid.

The furnace mix may be made up from any or all of rock salt, sodium sulfate and sodium bisulfate depending upon the available supply of these materials. When using sodium chloride, the amount employed is figured in terms of its equivalent of sodium sulfate.

Where sodium is supplied to the mix as rock salt (NaCl) in amounts less than one-third of the total sodium required from the furnace mix, no further sulfuric acid need be added to the batch other than that necessary to provide for the acidity equivalent of about 2–4% free sulfuric acid. It is not desirable, however, to supply more than one-third of the total sodium required in the furnace mix in the form of sodium chloride since that portion of the sodium chloride in excess of the one-third remains unreacted in the furnace, and accordingly makes necessary the addition to the furnace mix of sufficient sulfuric acid to convert the sodium of the unreacted sodium chloride to sodium sulfate and effect removal of chlorine from the furnace in the form of HCl. If under particular operating conditions, more than one-third of the sodium should be supplied to the furnace mix as sodium chloride, corresponding additional amounts of sulfuric acid are needed to effect removal of chlorine in the furnace. As the combined cost of sodium chloride and sulfuric acid is now generally in excess of the cost of salt cake or sodium bisulfate, it is preferred to employ not more than one-third of the needed sodium as sodium chloride.

After the $Na_2SO_4$–$P_2O_5$ ratio of the liquor in make-up tank 92 is adjusted, the liquor is then ready for furnacing. In accordance with the present invention, the liquor is continuously fed into the furnace, and the coal may be continuously or intermittently charged into the furnace. For instance, a liquor mix made up according to Example 1 or 2 may be fed into the furnace with not more than about 6000 lbs. of coal. Hence, a supply of coal passing through 1 mesh is maintained in bin 44, and the inlet coupling 58 of the liquor injector 41 is connected to the furnace mix tank 92 (Fig. 6).

In starting operations, the reaction chamber 51 is filled with a mass of crude trisodium phosphate furnace product from a previous operation. Lines 95 and 95', Figs. 1 and 2, indicate approximately the amount of crude trisodium phosphate product continuously maintained in the furnace. The quantities of air and oil admitted to burner 96 through oil line 97 and air inlet 98 are adjusted so that the fuel is substantially completely burned in combustion chamber 100, the combustion gases produced containing little or no oxygen entering reaction chamber 51 through gas inlet eye 23. Burner 96 is regulated so as to maintain temperatures in the reaction chamber not less than about 800° C. and preferably around 1000° C. The furnace is rotated in the direction of the arrow 29 (Fig. 2), and during the preliminary phases of operation slides 27 are closed.

The liquor is injected into the furnace, through conduit 53 (Fig. 3) and opening 66, by a current of air introduced into the mixing chamber 52 by pipe 61. The quantity of air admitted to chamber 52 is regulated by valve 63 so that the liquor passes opening 66 in such manner that the drops of liquor are large enough to prevent being swept out of the furnace through gas outlet eye 24 by the waste combustion gases entering the base of stack 37. The liquor is sprayed onto the surface of the bed of material in the reaction chamber 51, the spray extending from about outlet eye 24 over approximately three-quarters of the length of the bed of solid material in the reaction chamber, for example, as indicated by the dotted lines A and B, Fig. 1. Owing to the relative position of liquor feeder 41, as seen in Fig. 2, it is believed the liquor spray falls on the upper portion of the bed of material in the furnace, for example as within the area enclosed by dotted line 95' and the curved dotted line C, Fig. 2. When proceeding in accordance with the present example, the liquor may be injected into the reaction chamber at a rate of about 550 gallons per hour.

As noted, the coal from bin 44 may be charged into the reaction chamber continuously or intermittently depending upon the particular type of feeder employed. Under some operating conditions, it may be inconvenient to provide mechanism for continuously feeding a relatively small amount of solid material into the furnace. In the present instance, it is preferred to inject the coal intermittently at intervals ranging from about 1 to 3 minutes. Star feeder 45 is rotated at chosen intervals from a suitable source of power to feed coal from bin 44 into the hopper 47. The shaft 81 of the star feeder may be connected by any suitable mechanical devices to the valve 78 in the steam line 75, and arranged so that on rotation of star feeder 45 the steam valve 78 is correspondingly opened to force material through conduit 70 into the reaction chamber 51, in other words valve 78 and feeder 45 are operated synchronously. In the present example, feeder 45 and valve 78 may be controlled so as to feed into the furnace approximately 200 lbs. of coal per hour. The coal seems to be distributed over the length of the charge in the furnace, for example as within the dotted lines A and B of Fig. 1. On account of the location of the coal feeder 42, as shown in Fig. 2, it is thought the coal drops on the lower portion of the bed of material in the furnace, for example within a cross-sectional area bounded by line 95' and curved line D, Fig. 2. If desired, the coal and liquor may be mixed in proper proportions and fed into the furnace through a single injector.

In place of the liquor and coal feeders 41 and 42, it will be understood any other suitable apparatus may be employed by means of which distribution of liquor and coal in the reaction chamber may be obtained in a manner similar to that described above.

The exact nature of the reaction in the furnace between the several constituents is not known, although evidently the final results of such reactions are substantially the same as those of the Strickler and Lohmann patents. It is believed, however, that crude trisodium phosphate is produced in a short interval of time, and that the reaction may be considered a flash reaction effected almost immediately on feeding the dispersion of reactant materials into the furnace and distributing the materials over the bed of material in the furnace. The bed of product in the furnace is always in a substantially dry condition. As the product in the furnace adjacent the gas outlet eye 24 is the same as that product in the furnace adjacent the inlet eye 23, it appears the reactions involved take place substantially immediately on introduction of the raw materials into the furnace.

When the process is under way, slides 27 are adjusted so as to permit discharge of regulated quantities of furnace product through outlets 25. Discharge of furnace product may be continuous or intermittent. If the former, slides 27 may be partially displaced to permit continuous discharge of the desired relatively small amounts of furnace product. In some instances, it may be found convenient to withdraw the slides to the full open position during a few revolutions of the furnace, and close the slides during a corresponding number of revolutions. This latter method overcomes clogging of openings in plates 26 which may take place where comparatively small amounts of furnace product are continuously withdrawn. As the furnace is operated at about a balanced pressure, there is substantially no tendency for gas to escape through sleeves 25 when the latter are not covered by the bed of furnace product.

The amount of material thus discharged should be preferably such as to maintain in the shell a substantial body of furnace product, for example as indicated in Figs. 1 and 2 of the drawings. As shown in Figs. 1 and 2, the shell is provided with four such outlets, one pair being near eye 24. The material discharged from the reaction chamber through the outlets adjacent eye 24 is of the same nature as the product discharged through the outlets near eye 23, showing that the composition of the entire bed of material in the reaction chamber is substantially the same. The furnace product drops from hopper 30, and onto conveyor 32 which conducts the furnace product, usually while still hot, to a dissolver 101, Fig. 6.

The furnace product as introduced into the dissolver is a solid crude trisodium phosphate containing, for example, about 65% trisodium phosphate, 20% disodium phosphate in the form of pyrophosphate, and 15% insoluble matter. About 10% of the total $P_2O_5$ and sodium input to the furnace may be tied up in this insoluble matter as a complex compound, and such $P_2O_5$ and sodium values are recovered by subsequent treatment with caustic soda. On account of features involved in continuous furnacing, the crude furnace product contains smaller amounts of impurities than when the process is carried out on the batch basis. When furnacing by the batch method, the control conditions cannot readily be maintained uniform. In the continuous method, conditions during furnacing are substantially uniform, and subject to better control. Hence, it is believed the more uniform control obtainable in the continuous process is responsible for the production of a furnace product containing relatively small amounts of impurities. For example, in the present method the amount of sodium sulfate present is not generally more than 1-2%. It is thus possible to produce phosphates low in sulfate.

In dissolver 101, the furnace product may be dissolved in water, wash water, or trisodium phosphate mother liquor, and the mass is usually in a heated condition. From the dissolver, the trisodium phosphate liquor flows to subsequent stages of the process and may be employed in the manufacture of trisodium phosphate in the usual manner.

Figure 7:
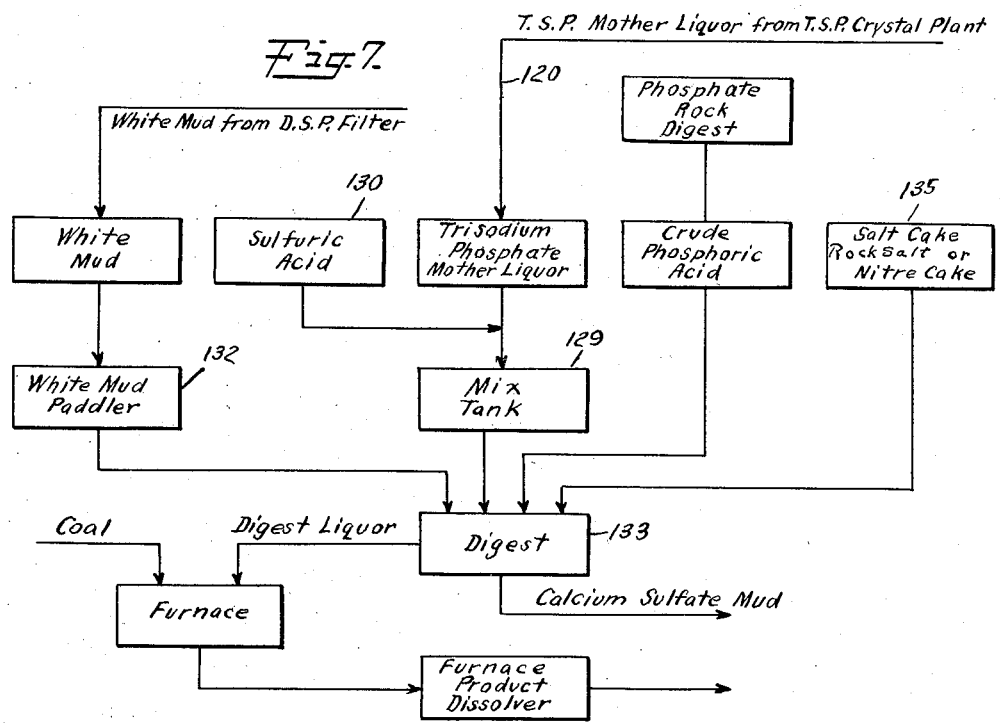
Fig. 7 is a flow sheet illustrating the procedure when utilizing by-product materials as sources of phosphate and sodium.

The operation of the process when employed to recover sodium and $P_2O_5$ values from by-product white mud, such as that obtained in the disodium phosphate process of the Levermore patent, and from trisodium phosphate mother liquors, from the trisodium phosphate crystallizers employed in the above described method of making trisodium phosphate, may be understood from a consideration of the flow sheet of Fig. 7 of the drawings.

Part or the whole of the trisodium phosphate mother liquor from the crystallizer of the trisodium phosphate process, the liquor containing principally trisodium phosphate, sodium hydroxide, sodium carbonate and sodium sulfate is run through line 120 into a mix tank 129 (Fig. 7), and the full amount of sulfuric acid, plus the 2-4% excess of acid above noted, needed for making up the final furnace mix is added thereto from a sulfuric acid tank 130. The total acid requirement is of course controlled by the amount of mother liquor and white mud going into the batch. The quantity of acid initially mixed with the mother liquor in mix tank 129 is sufficient to provide the entire amount of acid necessary to convert the sodium compounds of the mother liquor to sodium sulfate, and to transform the metal phosphates of white mud to phosphoric acid and the sodium fluosilicate of the white mud to sodium sulfate and hydrofluosilicic acid, and to provide the resulting mix an acidity equivalent to about 2–4% free sulfuric acid.

The reaction between the several constituents of the trisodium phosphate mother liquor and the sulfuric acid in mix tank 129 produces sodium sulfate and phosphoric acid with unreacted sulfuric acid remaining as such. After the reacted mother liquor and excess sulfuric acid are cooled, this mixture and a slurry of white mud from puddler 132, which mud may be obtained from the process of the above noted Levermore patent and containing chiefly disodium phosphate, dicalcium phosphate, phosphates of iron and aluminum, and sodium fluosilicate, are fed into digest tank 133. The digested liquor then contains all of the $P_2O_5$ of the mother liquor and white mud as phosphoric acid, and in addition includes sodium sulfate, some fluosilicic acid, dissolved iron and aluminium, precipitated calcium sulfate, and the above acidity equivalent to about 2–4% free sulfuric acid. The liquor in digester 133 is then ready for adjustment of the $Na_2SO_4$–$P_2O_5$ ratio in accordance with the Lohmann patent as above noted. Adjustment of the ratio may be effected in digester 133 either before or after the separation of the precipitated calcium sulfate from the liquor. Preferably, however, on completion of the digestion of the mother liquor, white mud and acid, the ratio adjustment is made, and then the calcium sulfate is permitted to settle out and is separated from the digest liquor in any suitable manner.

As this phase of the process is ordinarily practiced, around three-quarters to five-sixths of the amount of sodium required to make up the furnace mix in the digester 133 is furnished by the mother liquor and white mud. The deficiency of sodium in the digest liquor may be supplied by the addition thereto of sufficient quantities of salt cake, nitre cake, or rock salt from a source of supply 135 to bring up the sodium content of the digest liquor to the proper $Na_2SO_4$–$P_2O_5$ ratio. Where the sodium deficiency in the digest liquor is not more than one-third of the total amount required in the furnace mix, the deficiency in sodium may be made up solely by the addition of a desired quantity of sodium chloride, the amount of chloride being figured in terms of its equivalent of sodium sulfate. As pointed out above, it is not desirable for the reasons noted, to supply more than one-third of the total sodium required in the furnace mix since that portion of the sodium chloride in excess of one-third remains unreacted in the furnace, makes necessary the addition to the furnace mix of sufficient sulfuric acid to convert the sodium of the unreacted sodium chloride to sodium sulfate and effect removal of the chlorine from the furnace as hydrochloric acid.

The digest liquor thus made up, preferably after concentration to about 40° Bé., and the proper proportions of coal are fed into the furnace through injectors 41 and 42 (Fig. 1), and the furnacing operation is conducted substantially as described when operating the process on a production basis.

According to one feature of the invention, the process may be operated, substantially as follows, to recover sodium and $P_2O_5$ values from disodium phosphate mother liquor by furnacing. Any or all of the disodium phosphate mother liquor, for example from the disodium phosphate process of the Levermore patent, may be utilized in making up a mix of furnace liquor in a tank such as 92.

As above noted, the disodium phosphate mother liquor is relatively pure, and because of the absence from the disodium phosphate mother liquor of impurities such as fluorine, the disodium phosphate mother liquor may be employed directly in making up a batch of furnace liquor without treating the disodium phosphate mother liquor with sulfuric acid, as would be preferable if the disodium phosphate mother liquor, like the trisodium phosphate mother liquor, contained substantial amounts of impurities.

When refurnacing disodium phosphate mother liquor, the latter is run into a batch tank, and salt cake preferably is added in sufficient quantities until the above noted preferred $Na_2SO_4$–$P_2O_5$ ratio is obtained. The resulting liquor may be concentrated if desired, and continuously furnaced with coal as above described. When furnacing a mix of this nature, since impurities such as fluorine and silicon are not included in the liquor, the presence of acid during furnacing, to eliminate such impurities, is not necessary. Although nitre cake and sodium chloride may be incorporated in the make-up liquor, it is not especially desirable to use these materials since the acid of the nitre cake would be wasted, serving no useful purpose in furnacing, and sulfuric acid would be required to convert the sodium chloride to sodium sulfate if sodium chloride were used. Soda ash may be used.

The furnace products thus obtained may be utilized, as above described, to produce trisodium phosphate.

In the appended claims, the term "continuous" is intended to indicate a substantially uniform feed of reacting materials over a substantial period of time as distinguished from a batch operation, but it should be understood the feed need not be in an unbroken stream.

I claim:

1. In the process for the production of alkali metal phosphate involving furnacing alkali metal sulfate and phosphoric acid, the steps comprising forming an alkali sulfate-phosphoric acid containing liquor, maintaining in the furnacing zone a relatively dry body of alkali metal phosphate furnace product, tumbling the body of furnace product, continuously distributing alkali metal sulfate-phosphoric acid liquor over a major portion of the surface of said body, distributing carbonaceous material over a major portion of the surface of said body, furnacing the liquor material with carbonaceous material to produce alkali metal phosphate under conditions such as to maintain the resulting body of material in a relatively dry condition, and withdrawing from the furnacing zone a portion of the body of furnace product.

2. In the process for the production of trialkali metal phosphate by furnacing, the steps comprising forming a liquor containing dialkali metal phosphate and alkali metal sulfate, maintaining in the furnacing zone a body of trialkali metal phosphate furnace product, tumbling the body of furnace product, continuously distributing liquor and carbonaceous material over a major portion of said body, furnacing the liquor and carbonaceous material to produce trialkali metal phosphate furnace product, and withdrawing from the furnacing zone a portion of the body of furnace product.

3. In the manufacture of alkali metal phosphate furnace product predominating in trialkali metal phosphate by a process involving furnacing at elevated temperatures alkali metal sulfate containing material, phosphate radical containing material and carbonaceous material, the steps comprising continuously maintaining in a reaction zone a body comprising alkali metal phosphate furnace product, maintaining elevated furnacing temperatures in said zone, agitating said body to expose relatively fresh portions thereof, dispersing phosphate radical containing material and dispersing alkali metal sulfate material, in proportions reacting to form alkali metal phosphate predominating in trialkali metal phosphate, onto said exposed portions of said body, and furnacing said materials at the elevated furnacing temperatures and in the presence of such quantities of carbonaceous material as to effect production of alkali metal phosphate furnace product predominating in trialkali metal phosphate.

4. In the manufacture of alkali metal phosphate furnace product predominating in trialkali metal phosphate by a process involving furnacing at elevated temperatures alkali metal sulfate containing material, phosphate radical containing material and carbonaceous material, the steps comprising continuously maintaining in a reaction zone a body comprising alkali metal phosphate furnace product, maintaining elevated furnacing temperatures in said zone, tumbling said body of furnace product, dispersing phosphate radical containing material and dispersing alkali metal sulfate material, in proportions reacting to form alkali metal phosphate predominating in trialkali metal phosphate, over a substantial portion of the furnace of said body, introducing carbonaceous material into said zone, and furnacing said materials at the elevated furnacing temperatures to effect production of alkali metal phosphate furnace product predominating in trialkali metal phosphate.

5. In the manufacture of alkali metal phosphate furnace product predominating in trialkali metal phosphate by a process involving furnacing at elevated temperatures alkali metal sulfate containing material, phosphate radical containing material and carbonaceous material, the steps comprising continuously maintaining in a reaction zone a body comprising alkali metal phosphate furnace product, maintaining elevated furnacing temperatures in said zone, continuously agitating said body to expose relatively fresh portions thereof, continuously dispersing phosphate radical containing material and continuously dispersing alkali metal sulfate material, in proportions reacting to form alkali metal phosphate predominating in trialkali metal phosphate, onto said exposed portions of said body, introducing carbonaceous material into said zone, furnacing said materials at the elevated furnacing temperatures to effect production of alkali metal phosphate furnace product predominating in trialkali metal phosphate, and withdrawing furnace product from said zone during the course of the reaction.

6. In the manufacture of alkali metal phosphate furnace product predominating in trialkali metal phosphate by a process involving furnacing at elevated temperatures alkali metal sulfate containing material, phosphate radical containing material and carbonaceous material, the steps comprising continuously maintaining in a reaction zone a body comprising alkali metal phosphate furnace product, maintaining elevated furnacing temperatures in said zone, exposing relatively fresh portions of said body, dispersing phosphate radical containing material and dispersing alkali metal sulfate material, in proportions reacting to form alkali metal phosphate predominating in trialkali metal phosphate, onto the freshly exposed portions of said body, and furnacing said materials at the elevated furnacing temperatures and in the presence of such quantities of carbonaceous material as to effect production of alkali metal phosphate furnace product predominating in trialkali metal phosphate.

7. In the manufacture of alkali metal phosphate furnace product predominating in trialkali metal phosphate by a process involving furnacing at elevated temperatures alkali metal sulfate containing material, phosphoric acid containing material and carbonaceous material, the steps comprising continuously maintaining in a reaction zone a body comprising alkali metal phosphate furnace product, maintaining elevated furnacing temperatures in said zone, exposing relatively fresh portions of said body, dispersing phosphoric acid containing material and dispersing alkali metal sulfate material, in proportions reacting to form alkali metal phosphate predominating in trialkali metal phosphate, onto said exposed portions of said body, introducing carbonaceous material into said zone, and furnacing said materials at the elevated furnacing temperatures to effect production of alkali metal phosphate furnace product predominating in trialkali metal phosphate.

8. In the manufacture of alkali metal phosphate furnace product predominating in trialkali metal phosphate by a process involving furnacing at elevated temperatures alkali metal sulfate containing material, phosphate radical containing material and carbonaceous material, the steps comprising forming a liquor containing alkali metal sulfate material and phosphate radical containing material in proportions reacting to form alkali metal phosphate predominating in trialkali metal phosphate, continuously maintaining a body comprising alkali metal furnace product in a reaction zone, maintaining elevated furnacing temperatures in said zone, agitating said body to expose relatively fresh portions thereof, dispersing said liquor onto said exposed portions of said body, introducing carbonaceous material into said zone, and furnacing the liquor and carbonaceous material at the elevated furnacing temperatures to effect production of alkali metal phosphate furnace product predominating in trialkali metal phosphate.

9. In the manufacture of alkali metal phosphate furnace product predominating in trialkali metal phosphate by a process involving furnacing at elevated temperatures alkali metal sulfate containing material, phosphate radical containing material and carbonaceous material, the steps comprising forming a liquor containing alkali metal sulfate material and phosphate radical containing material in proportions reacting to form alkali metal phosphate predominating in trialkali metal phosphate, continuously maintaining a body comprising alkali metal furnace product in a reaction zone, maintaining elevated furnacing temperatures in said zone, continuously agitating said body to expose relatively fresh portions thereof, continuously dispersing said liquor onto said exposed portions of said body, introducing carbonaceous material into said zone, and furnacing the liquor and carbonaceous material at the elevated furnacing temperatures to effect production of alkali metal phosphate furnace product predominating in trialkali metal phosphate.

10. In the manufacture of a furnace product comprising predominately trialkali metal phosphate by a process involving furnacing at elevated temperatures alkali metal sulfate containing material, phosphoric acid containing material and carbonaceous material, the steps comprising continuously maintaining in a reaction zone a body comprising alkali metal phosphate furnace product, maintaining elevated furnacing temperatures in said zone, continuously agitating said body to expose relatively fresh portions thereof, continuously dispersing phosphoric acid containing material and continuously dispersing alkali metal sulfate material, in proportions reacting to form a product comprising predominately trialkali metal phosphate, onto said exposed portions of said body, introducing carbonaceous material into said zone, furnacing said materials at the elevated furnacing temperatures to effect production of furnace product comprising predominately trialkali metal phosphate, and withdrawing furnace product from said zone during the course of the reaction.

11. In the manufacturing of a furnace product comprising predominately trialkali metal phosphate by a process involving furnacing at elevated temperatures alkali metal sulfate containing material, dialkali metal phosphate containing material and carbonaceous material, the steps comprising continuously maintaining in a reaction zone a body comprising alkali metal phosphate furnace product, maintaining elevated furnacing temperatures in said zone, exposing relatively fresh portions of said body, dispersing dialkali metal phosphate containing material and dispersing alkali metal sulfate material, in proportions reacting to form a product comprising predominately trialkali metal phosphate, onto the freshly exposed portions of said body, introducing carbonaceous material into said zone, and furnacing said materials at the elevated furnacing temperatures to effect production of furnace product comprising predominately trialkali metal phosphate.

12. In the manufacture of a furnace product comprising predominately trialkali metal phosphate by a process involving furnacing at elevated temperaures alkali metal sulfate containing material, phosphate radical containing material and carbonaceous material, the steps comprising forming a liquor containing alkali metal sulfate material and phosphate radical containing material in proportions reacting to form a product comprising predominately trialkali metal phosphate, continuously maintaining a body comprising alkali metal furnace product in a reaction zone, maintaining elevated furnacing temperatures in said zone, exposing relatively fresh portions of said body, dispersing said liquor onto the freshly exposed portions of said body, introducing carbonaceous material into said zone, and furnacing the liquor and carbonaceous material at the elevated furnacing temperatures to effect production of furnace product comprising predominately trialkali metal phosphate.

13. In the manufacture of a furnace product comprising predominately trialkali metal phosphate by a process involving furnacing at elevated temperatures alkali metal sulfate containing material, phosphoric acid containing material and carbonaceous material, the steps comprising forming a liquor containing alkali metal sulfate material and phosphoric acid containing material in proportions reacting to form a product comprising predominately trialkali metal phosphate, continuously maintaining a body comprising alkali metal furnace product in a reaction zone, maintaining elevated furnacing temperatures in said zone, tumbling said body of furnace product, continuously dispersing said liquor over a substantial portion of the surface of said body, introducing carbonaceous material into said zone, furnacing the liquor and carbonaceous material at the elevated furnacing temperatures to effect production of furnace product comprising predominately trialkali metal phosphate, and withdrawing furnace product from said zone during the course of the reaction.

LOUIS PREISMAN.